US010169595B2

(12) United States Patent
Barsness et al.

(10) Patent No.: US 10,169,595 B2
(45) Date of Patent: Jan. 1, 2019

(54) DETECTING MALICIOUS DATA ACCESS IN A DISTRIBUTED ENVIRONMENT

(71) Applicant: International Business Machines Corporation, Armonk, NY (US)

(72) Inventors: Eric L. Barsness, Pine Island, MN (US); Daniel E. Beuch, Rochester, MN (US); Brian R. Muras, Otsego, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 15/160,977

(22) Filed: May 20, 2016

(65) Prior Publication Data

US 2017/0339150 A1 Nov. 23, 2017

(51) Int. Cl.
*G06F 21/62* (2013.01)
*H04L 29/06* (2006.01)
*G06F 21/55* (2013.01)

(52) U.S. Cl.
CPC ........ *G06F 21/6209* (2013.01); *G06F 21/552* (2013.01); *G06F 21/554* (2013.01); *H04L 63/102* (2013.01); *H04L 63/1425* (2013.01); *G06F 21/62* (2013.01); *G06F 21/6218* (2013.01); *H04L 63/10* (2013.01); *H04L 63/14* (2013.01); *H04L 63/1433* (2013.01); *H04L 63/1441* (2013.01)

(58) Field of Classification Search
CPC ..... H04L 63/10; H04L 63/14; H04L 63/1425; H04L 63/1433; H04L 63/1441; H04L 29/06; G06F 21/62; G06F 21/6209; G06F 21/6218; G06F 21/55
See application file for complete search history.

(56) References Cited

U.S. PATENT DOCUMENTS

| | | | |
|---|---|---|---|
| 5,924,094 A * | 7/1999 | Sutter | G06F 17/30575 |
| 6,446,092 B1 * | 9/2002 | Sutter | G06F 17/30578 |
| 7,406,714 B1 | 7/2008 | Nachenberg | |
| 7,774,361 B1 | 8/2010 | Nachenberg et al. | |
| 8,315,991 B2 * | 11/2012 | Mandagere | G06F 11/1435 707/685 |
| 8,572,736 B2 * | 10/2013 | Lin | G06F 11/076 713/188 |
| 2004/0088561 A1 | 5/2004 | Dettinger et al. | |

(Continued)

OTHER PUBLICATIONS

Wang, Shiyuan, et al., "HengHa: Data Harvesting Detection on Hidden Databases," Proceedings of the 2010 ACM Workshop on Cloud Computing Security Workshop, ACM, 2010, 11 pages.
Liu, Alan Y., et al., "Using Consensus Clustering for Multi-View Anomaly Detection," 2012 IEEE Symposium on Security and Privacy Workshops (SPW), pp. 117-124, IEEE, 2012.

(Continued)

*Primary Examiner* — Jayesh M Jhaveri
(74) *Attorney, Agent, or Firm* — Patterson + Sheridan, LLP

(57) ABSTRACT

Systems, methods, and computer program products to perform an operation comprising identifying a first access to a first subset of a first database table on a first storage node, of a plurality of storage nodes, identifying a second access to a second subset of the first database table on a second storage node, of the plurality of storage nodes, and performing a predefined operation to restrict access to the first database table on the plurality of storage nodes based on the first and second accesses.

17 Claims, 6 Drawing Sheets

(56) References Cited

U.S. PATENT DOCUMENTS

| | | | |
|---|---|---|---|
| 2004/0250098 A1* | 12/2004 | Licis | G06F 21/604 |
| | | | 713/193 |
| 2006/0294095 A1 | 12/2006 | Berk et al. | |
| 2007/0240217 A1* | 10/2007 | Tuvell | G06F 21/56 |
| | | | 726/24 |
| 2014/0181975 A1* | 6/2014 | Spernow | G06F 21/562 |
| | | | 726/23 |
| 2015/0142749 A1* | 5/2015 | Broll | G06F 11/1451 |
| | | | 707/654 |

OTHER PUBLICATIONS

Valeur, Fredrik, et al., "A Learning-Based Approach to the Detection of SQL Attacks," Detection of Intrusions and Malware, and Vulnerability Assessment, pp. 123-140, 2005.

Kamra, Ashish, et al., "Detecting anomalous access patterns in relational databases", The VLDB Journal, Aug. 2008, vol. 17, Issue 5, pp. 1063-1077, published online May 17, 2007 © Springer-Verlag 2007. [abstract only].

Govinda, K., et al. "Database Audit over Cloud Environment Using Forensic Analysis Algorithm", International Journal of Engineering and Technology (IJET), vol. 5, No. 2, Apr.-May 2013, pp. 696-699. <http://citeseerx.ist.psu.edu/viewdoc/download?doi=10.1.1.411.8161&rep=rep1&type=pdf>.

Akoglu, Leman, et al., "Fast and Reliable Anomaly Detection in Categorical Data", CIKM '12, Oct. 29-Nov. 2, 2012, Maui, HI, USA, 10 pages. <http://www3.cs.stonybrook.edu/~leman/pubs/12-akoglu-anomaly-categoric.pdf>.

Chandola, Varun, et al., "Anomaly Detection: A Survey", ACM Computing Surveys, Sep. 2009, 72 pages. <http://cucis.ece.northwestern.edu/projects/DMS/publications/AnomalyDetection.pdf>.

* cited by examiner

Bitmap 140:
000000000000000000000000000000000000
000000000000000000000000000000000000
111111111111111111111111111111111111
111111111111111111111111111111111111
000000000000000000000000000000000000
000000000000000000000000000000000000
000000000000000000000000000000000000
000000000000000000000000000000000000

Bitmap 141:
111111111111111111111111111111111111
111111111111111111111111111111111111
000000000000000000000000000000000000
000000000000000000000000000000000000
000000000000000000000000000000000000
000000000000000000000000000000000000
000000000000000000000000000000000000
000000000000000000000000000000000000

Bitmap 142:
000000000000000000000000000000000000
000000000000000000000000000000000000
000000000000000000000000000000000000
000000000000000000000000000000000000
000000000000000000000000000000000000
000000000000000000000000000000000000
111111111111111111111111111111111111
111111111111111111111111111111111111

Comparison result Bitmap 601:
111111111111111111111111111111111111
111111111111111111111111111111111111
111111111111111111111111111111111111
111111111111111111111111111111111111
000000000000000000000000000000000000
000000000000000000000000000000000000
111111111111111111111111111111111111
111111111111111111111111111111111111

FIG. 6

DETECTING MALICIOUS DATA ACCESS IN A DISTRIBUTED ENVIRONMENT

BACKGROUND

The present invention relates to computer databases, and more specifically, to detecting malicious data access in a distributed environment.

Databases may be used to store sensitive information, such as employee records or other personal information. Often times, this information is the target of malicious users. Indeed, unauthorized users often make improper accesses to database data. As such, database security is of great importance.

SUMMARY

In one embodiment, a method comprises identifying a first access to a first subset of a first database table on a first storage node, of a plurality of storage nodes, identifying a second access to a second subset of the first database table on a second storage node, of the plurality of storage nodes, and performing a predefined operation to restrict access to the first database table on the plurality of storage nodes based on the first and second accesses.

In another embodiment, a system comprises a processor and a memory storing instructions, which when executed by the processor, performs an operation comprising identifying a first access to a first subset of a first database table on a first storage node, of a plurality of storage nodes, identifying a second access to a second subset of the first database table on a second storage node, of the plurality of storage nodes, and performing a predefined operation to restrict access to the first database table on the plurality of storage nodes based on the first and second accesses.

In another embodiment, a computer program product comprises a computer-readable storage medium having computer-readable program code embodied therewith, the computer-readable program code executable by a processor to perform an operation comprising identifying a first access to a first subset of a first database table on a first storage node, of a plurality of storage nodes, identifying a second access to a second subset of the first database table on a second storage node, of the plurality of storage nodes, and performing a predefined operation to restrict access to the first database table on the plurality of storage nodes based on the first and second accesses.

BRIEF DESCRIPTION OF THE SEVERAL VIEWS OF THE DRAWINGS

FIG. 6 illustrates example bitmaps used to detect malicious data access, according to one embodiment.

DETAILED DESCRIPTION

Embodiments disclosed herein provide databases, replication platforms, and clustering software which are able to determine that data is systematically being extracted in small pieces with the goal of improperly extracting the data in a database table. Generally, embodiments disclosed herein monitor all accesses to database data that is stored in different locations in a network (or multiple networks). The database accesses may be communicated to a system component which monitors system-wide database accesses. If the monitoring component determines that the database data is being systematically extracted in small increments across the network, the monitoring component may trigger an alert to prevent further access to the data.

Figure 1:
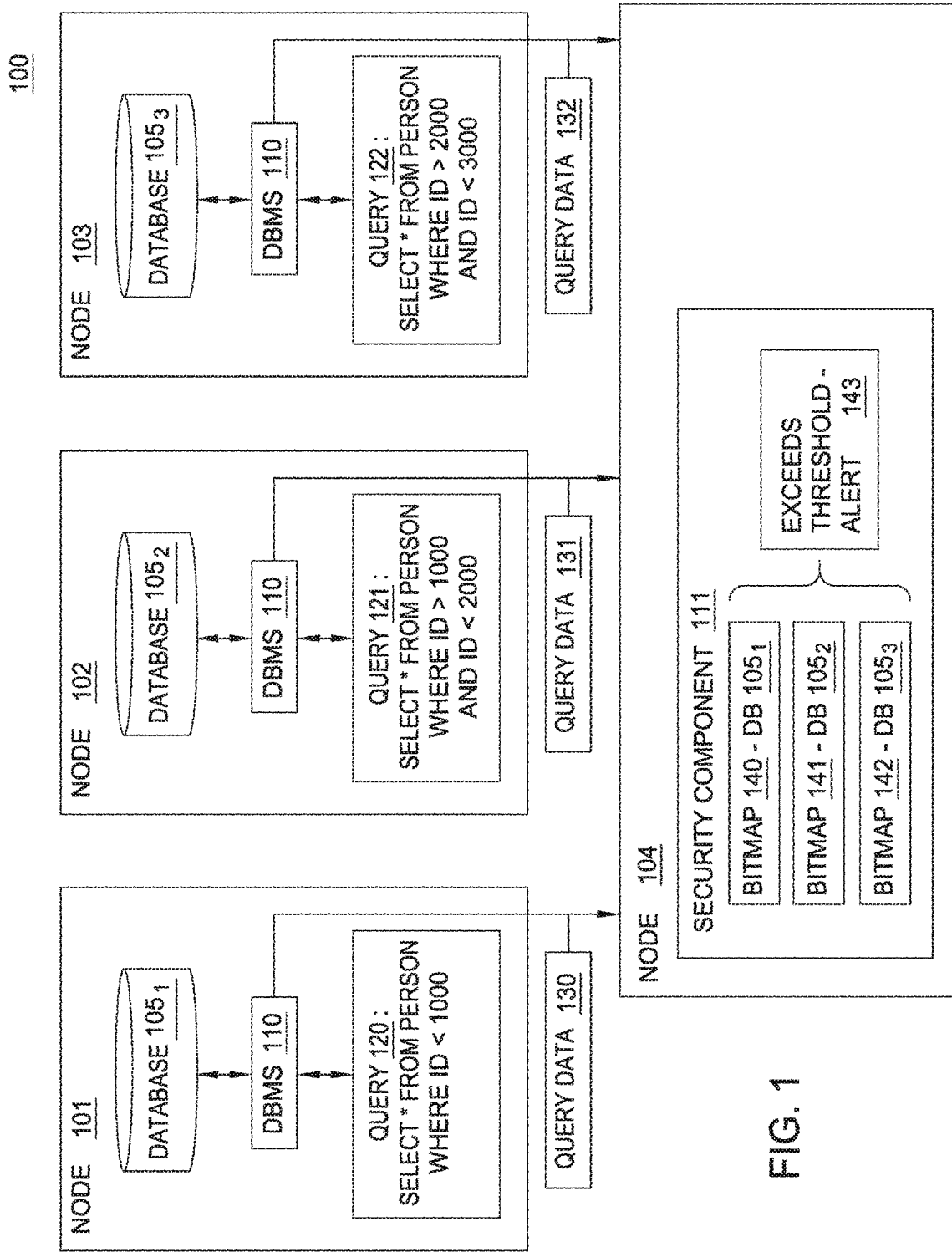
FIG. 1 illustrates an example distributed computing environment 100 which detects malicious data access, according to one embodiment.

FIG. 1 illustrates an example distributed computing environment 100 which detects malicious data access, according to one embodiment. As shown, the distributed computing environment 100 includes four example nodes 101-104. The nodes 101-104 may be any type of computing system, including compute nodes, storage nodes, high availability nodes, disaster recovery nodes, data warehouse nodes, data mart nodes, and the like. Although four nodes are depicted, the distributed computing environment 100 may have any number and type of nodes. Furthermore, the nodes 101-104 may correspond to virtualized systems on one or more physical host machines. As shown, the nodes 101-104 each include a database $105_{1-3}$, respectively and a database management system (DBMS) 110. The DBMS 110 is generally responsible for creating, maintaining, and managing databases, such as the databases $105_{1-3}$. The databases $105_{1-3}$ are organized collections of data. In some embodiments, the databases $105_{1-3}$ are identical copies of each other. In other embodiments, the databases $105_{1-3}$ are substantially similar, but not identical copies of each other. For example, database $105_2$ may be a compressed version of databases $105_{1,3}$.

Generally, users may interact with the data stored in the databases $105_{1-3}$. In at least one embodiment, users may issue queries through the DBMS 110, which may return the requested data to the user. As shown, for example, the DBMS 110 of node 101 may receive a query 120, which includes the example query language "select * from person where ID<1000." In response to the query 120, the DBMS 110 of node 101 may reference the database $105_1$ and return the requested data records. Similarly, as shown, the DBMS 110 of node 102 may receive a query 121, which includes the example query language "select * from person where ID>1000 and ID<2000." In response to the query 121, the DBMS 110 of node 102 may reference the database $105_2$ and return the requested data records. Similarly, as shown, the DBMS 110 of node 103 may receive a query 122, which includes the example query language "select * from person where ID>2000 and ID<3000." In response to the query 121, the DBMS 110 of node 103 may reference the database $105_3$ and return the requested data records.

The queries 120-122 may reflect that a user is inappropriately attempting to capture all of the data in the person table in a piecewise fashion without triggering any safeguards implemented in the computing environment 100 to thwart the theft of database data. Indeed, rather than capturing all of the data from a single instance of the databases $105_{1-3}$ using a single query, the user is issuing queries 120-122 to extract 1,000 records from each instance of the databases $105_{1-3}$. The user may continue this incremental selection process on the databases $105_{1-3}$ (and/or other databases which are not pictured) until the user obtains all data stored in the person table.

Generally, querying millions of rows of data increases the likelihood that the user's activity will be noticed during an audit. However, in an attempt for the access to go unnoticed, the user may not access an entire data set at one time. Instead, as shown in FIG. 1, the user may access smaller amounts of data over time, as such smaller accesses are less likely to be noticed. Given enough time, the users may eventually be able to put all of the pieces together and have all of the database data (e.g., from the queries 120-122). In such cases, the users may spread their attacks across these sources, making it more difficult to detect these malicious attacks.

Advantageously, however, the computing environment 100 is configured to thwart the malicious attack on the databases $105_{1-3}$. Generally, the DBMS 110 may keep track of all data (e.g., rows, columns, tables, etc.) being read. The DBMS 110 may keep track on a per-user and/or per-client machine basis. More generally, the DBMS 110 may keep track of other statistics related to the query to facilitate the discovery of data access trends. As shown, the DBMS 110 of each node 101-103 may transmit the query data 130-132, respectively, to the node 104. Generally, the query data 130-132 is an indication of queries received and processed by the DBMS 110. The query data 130-132 may include query language (e.g., structured query language, SQL), metadata describing the query, such as a user who issued the query, an application used to issue the query, a time the query was received and/or processed, and an indication of what data was accessed in the database by the query. The security component 111 is configured to receive the query data 130-132, and determine whether an unauthorized attack is occurring on the distributed databases $105_{1-3}$. In at least one embodiment, the security component 111 is a component of the DBMS 110. However, the security component 111 may also be integrated in replication platforms, clustering software, or any other platform in the computing environment 100.

Generally, the DBMS 110 and/or the security component 111 may use the query data 130-132 to keep track of what data is being read in the databases $105_{1-3}$. As shown, the security component includes three example bitmaps, namely bitmaps 140-142, which correspond to databases $105_{1-3}$, respectively. Generally, a bitmap is a mapping from some domain (e.g., data in the databases $105_{1-3}$) to bits. Although only three bitmaps are pictured, any number of bitmaps may be used. In at least one embodiment, the security component 111 (and/or each DBMS 110) may maintain a bitmap for each table in the databases $105_{1-3}$. Generally, the bitmaps 140-142 may have any number of dimensions. In one embodiment, a one-dimensional bitmap tracks access to each row (or a set of rows) in a table of the databases $105_{1-3}$. Therefore, if data from row 1,000 of the person table is read, a bit corresponding to this row in the bitmap may be marked as "1" to indicate the data of row 1,000 of the person table has been read. In another embodiment, a two-dimensional bitmap is used to monitor accesses to each row and column of a given table. In still another embodiment, a three-dimensional bitmap may monitor accesses to the rows and columns of a given table, with a third dimension monitoring the user ID (or application ID) that is accessing the database data. In at least one embodiment, the bitmaps 140-142 are sparse bitmaps, which saves space by associating more than one row or column in the databases $105_{1-3}$ with a bit in the bitmap.

The security component 111 may analyze the received query data 130-132 to update the bitmaps 140-142. Generally, when a row or column of data is read, the security component 111 may update the bitmap 140-142 for the respective table to reflect the reading of the data. The security component 111 may then analyze the bitmaps 140-142 to determine whether a distributed attack is being waged on the databases. For example, the security component 111 may perform a mathematical operation on the bitmaps 140-142. In one embodiment, the security component 111 may perform an "OR" operation on the bitmaps 140-142 to determine the extent to which the data of a table has been read. If the result of the OR operation indicates that a number of rows that have been read exceeds a threshold number, the security component 111 may generate an alert 143. The alert 143 may generally correspond to any predefined operation, such as restricting access to the database table, sending an email alert to a system administrator, locking user and/or application accounts, and the like. In another embodiment, the bitmaps 111 may perform an "AND" operation on the bitmaps 140-142 to identify high-value data that is being targeted. If the result of the AND operation exceeds a threshold number of bits, the security component 111 may again issue an alert 143. In another embodiment, the security component 111 may perform an "XOR" operation on the bitmaps 140-142 and additional bitmaps (not pictured) that track access to database data by trusted applications. If the result of the XOR operation exceeds a threshold number of bits, the security component 111 may again issue an alert 143.

In addition, the security component 111 and/or the DBMS 110 may maintain associations between one or more of the columns, tables, or databases in the system 110. For example, the database $105_2$ may include a table named "person_table," while databases $105_{1,3}$ include the table named "person." However, the data in each of these tables may be identical (or substantially similar). The security component 111 and/or the DBMS 110 may maintain associations or correlations between copies of transformed, but otherwise related database tables. Doing so allows the security component 111 to detect distributed attacks on database data even if the database, the tables, or any aspect thereof has been modified.

Figure 2:
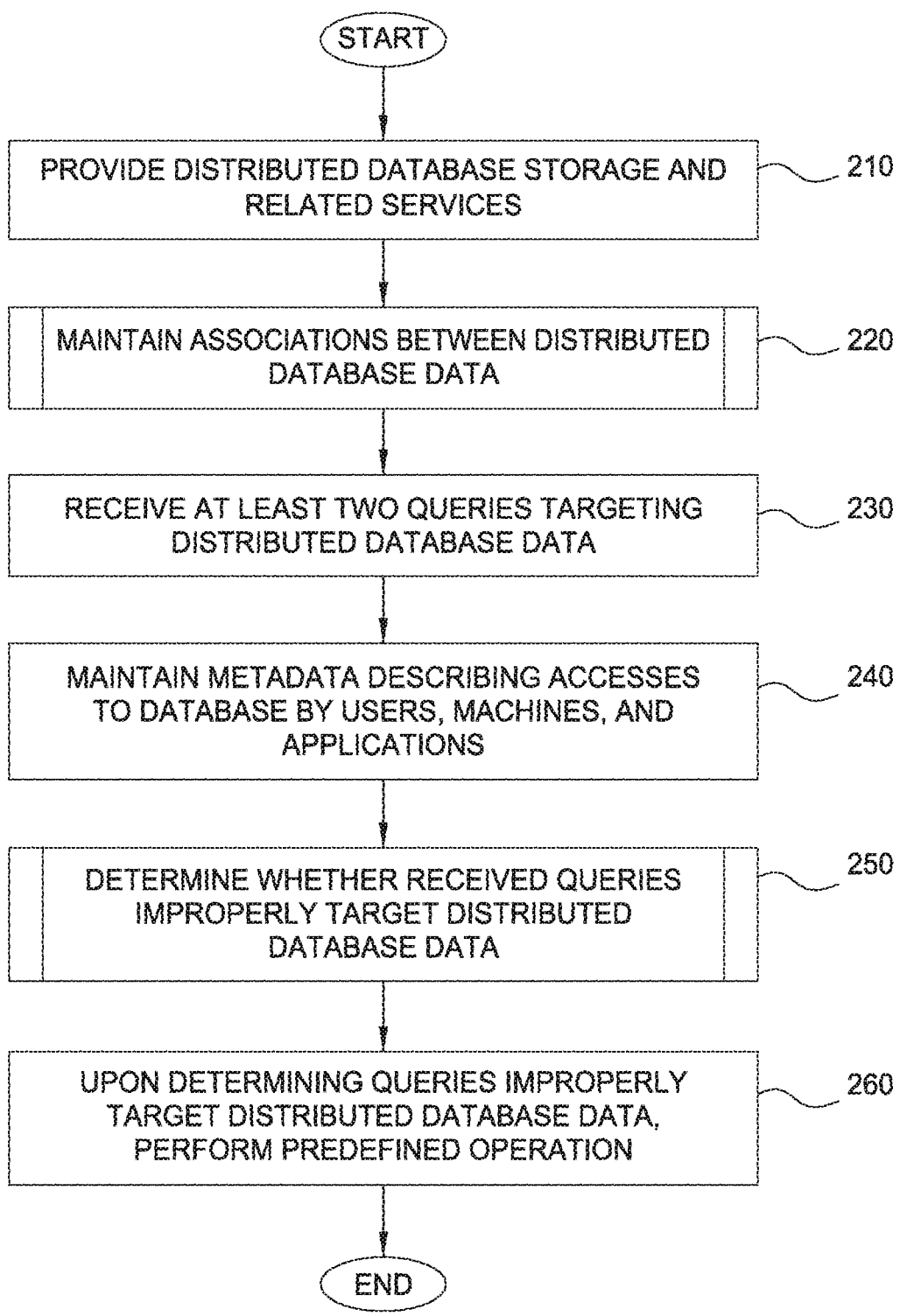
FIG. 2 is a flow chart illustrating a method for detecting malicious data access in a distributed environment, according to one embodiment.

FIG. 2 is a flow chart illustrating a method 200 for detecting malicious data access in a distributed environment, according to one embodiment. As shown, the method 200 begins at block 210, where distributed database storage and related services are provided in a distributed computing environment. For example, as described with reference to FIG. 1, copies of databases may be stored on different compute nodes. These copies may be used, for example, to balance the load of applications and services accessing the databases. The related services may include replication services, high availability services, data warehouses, data marts, interfaces to each database, and the like. At block 220, described in greater detail with reference to FIG. 3, associations between distributed database data are maintained. Generally, in some cases, databases may be modified on some machines. For example, the database data may be aggregated, summarized, or truncated, or column and/or table names may be changed, and the like. Therefore, the associations correlate related, but modified database metadata and data. The associations also correlate identical copies of database data.

At block 230, the DBMS 110 may receive at least two queries targeting the data in copies of the distributed database data. At block 240, the DBMS 110 and/or the security component may maintain metadata describing the accesses to the database data by users, machines, and applications. For example, the metadata may describe the time a query was executed, the age of the records returned by the database responsive to the query, the user, application, or machine issuing the query, the data targeted and returned by the query, and the like. By maintaining the metadata describing the queries, the DBMS 110 and/or the security component 111 may be able to merge queries issued by different user accounts, applications, machines, and the like, in the event that multiple user accounts, systems, or applications are being used to steal data. At block 250, described in greater detail with reference to FIG. 4, the DBMS 110 and/or the security component 111 may determine whether the received queries are improperly targeting the distributed database data. Generally, at block 250, the DBMS 110 and/or the security component 111 determine whether a piecewise, incremental extraction of the database data is occurring. The DBMS 110 and/or the security component 111 may determine whether the improper targeting according to periodic timing intervals (e.g., once per hour, once per day, and the like). At block 260, upon determining the queries improperly target the distributed database data, the security component 111 and/or the DBMS 110 may perform a predefined operation to restrict access to the database data, or otherwise implement a security mechanism. For example, user accounts may be disabled, the affected database data (and/or the database itself) may be locked down, administrators may be notified, and the like.

Figure 3:
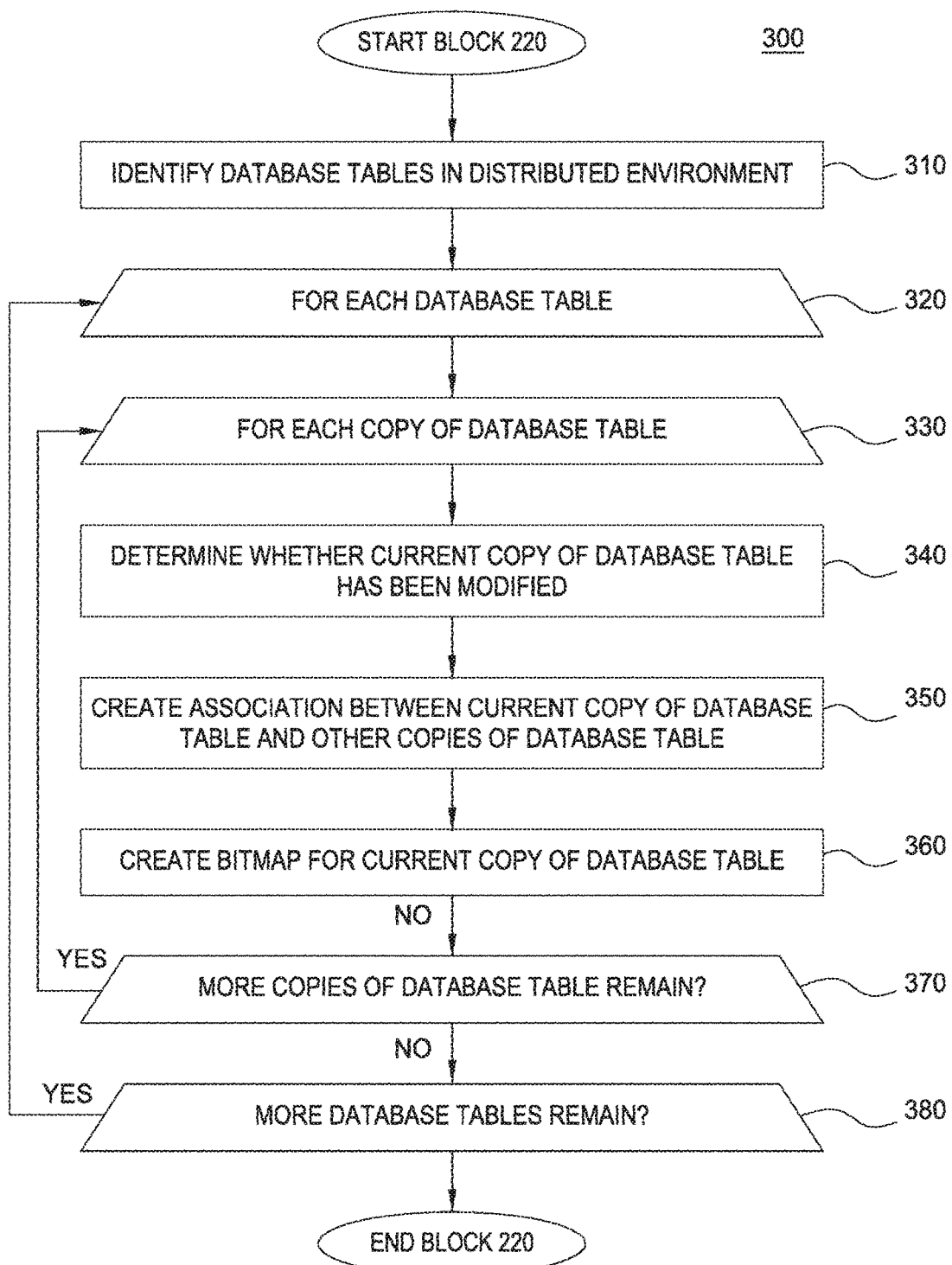
FIG. 3 is a flow chart illustrating a method to maintain associations between distributed database data, according to one embodiment.

FIG. 3 is a flow chart illustrating a method 300 corresponding to block 220 to maintain associations between distributed databases, according to one embodiment. As shown, the method 300 begins at block 310, a user or an application (such as the DBMS 110 and/or the security component 111) may identify all (or a set of) database tables in a distributed computing environment. The user may also provide associations between copies of database tables, which may include modified variants of the database tables. At block 320, the DBMS 110 and/or the security component 111 may execute a loop including blocks 330-380 for each database table identified at block 310. At block 330, the DBMS 110 and/or the security component 111 may execute a loop including blocks 340-370 for each copy of the current database table.

At block 340, the DBMS 110 and/or the security component 111 may determine whether the current copy of the database table is modified relative to other copies of the current database table. For example, the user may provide an indication that the current copy has been modified. Similarly, the DBMS 110 and/or the security component 111 may analyze the database table relative to other copies of the current database table to determine whether the current table has been modified in some way. At block 350, the DBMS 110 and/or the security component 111 may create and store an association between the current copy of the database table and other copies of the current database table. At block 360, the DBMS 110 and/or the security component 111 may create a bitmap for the current copy of the database table. The bitmap may generally track accesses to the rows and columns of the table, and may be of any dimensions, as described above. At block 370, the DBMS 110 and/or the security component 111 determine whether more copies of the database remain. If more copies remain, the method returns to block 330, otherwise the method proceeds to block 380. At block 380, the DBMS 110 and/or the security component 111 may determine whether more database tables remain. If more database tables remain, the method returns to block 320, otherwise, the method 300 ends.

Figure 4:
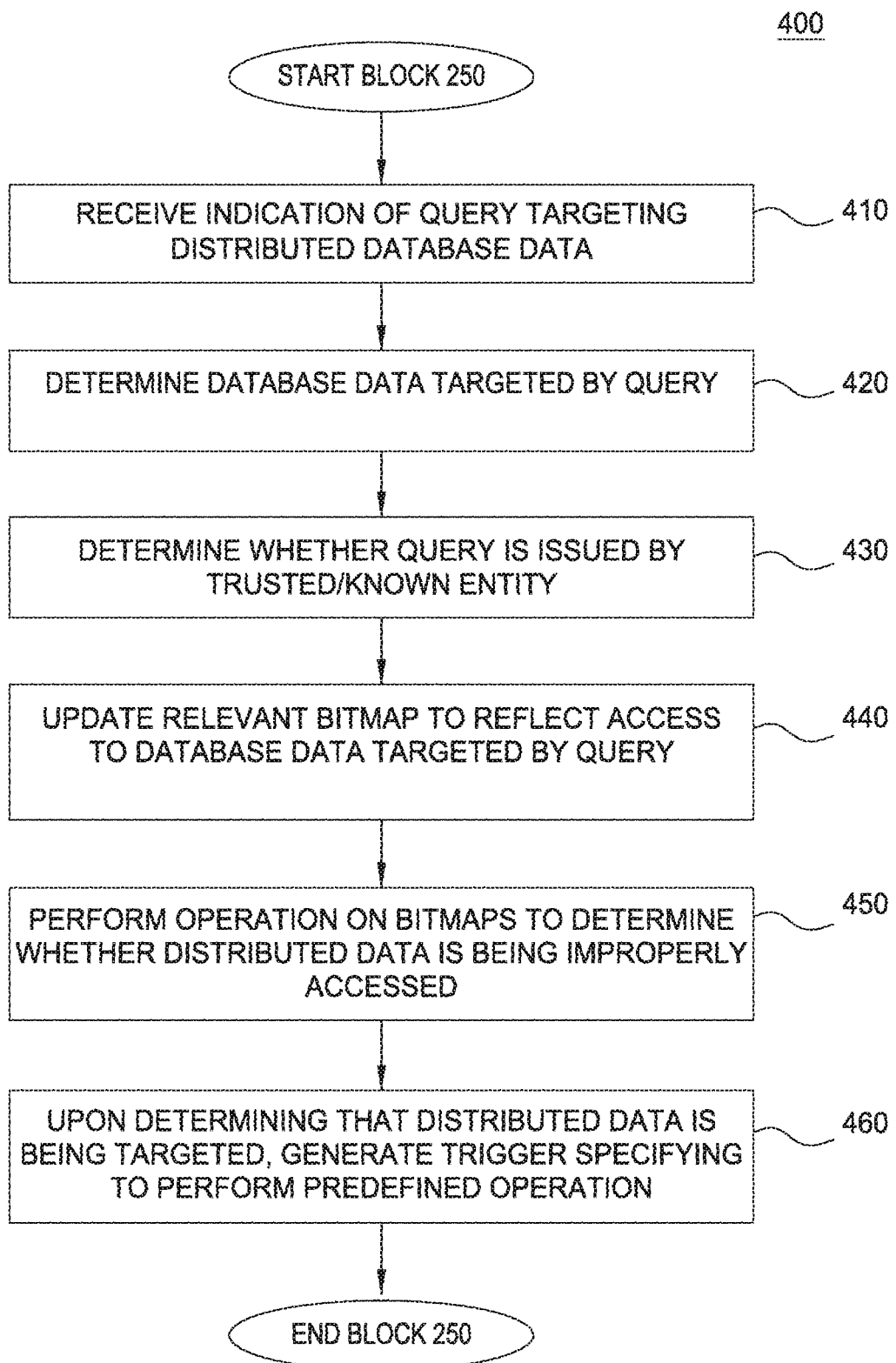
FIG. 4 is a flow chart illustrating a method to determine whether queries improperly target distributed database data, according to one embodiment.

FIG. 4 is a flow chart illustrating a method 400 corresponding to block 250 to determine whether queries improperly target distributed database data, according to one embodiment. As shown, the method 400 begins at block 410, where the DBMS 110 and/or the security component 111 may receive an indication of one or more queries targeting distributed database data. Generally, whenever the DBMS 110 receives a predefined number of queries (e.g., 1, 10, 100, etc.), the DBMS 110 may capture metadata describing the queries, and optionally transmit the metadata (and the query itself) to the security component 111. At block 420, the DBMS 110 and/or the security component 111 may determine the database data targeted by the query, such as a table, set of columns, and number of rows. At block 430, the DBMS 110 and/or the security component 111 may determine whether the query is issued by a trusted or known entity, such as a trusted application, system administrator, and the like. For example, a payroll application may run at predefined time intervals, and the DBMS 110 and/or the security component 111 may ignore these known, trusted data accesses. However, in one embodiment, the DBMS 110 and/or the security component 111 may analyze the data accessed by the trusted application, as a user may hijack the trusted application to access more data than should be collected. For example, if the weekly payroll application accesses data covering the last 10 years, rather than the last week, the DBMS 110 and/or the security component 111 may determine that the access is improper. At block 440, the DBMS 110 and/or the security component 111 may update the relevant bitmaps to reflect the access to data targeted by the queries. For example, if the query targets a payroll table, the DBMS 110 and/or the security component 111 may set a bit in the bitmap corresponding to this data access.

At block 450, the DBMS 110 and/or the security component 111 may perform an operation on the relevant bitmaps to determine whether the database data is being improperly accessed. For example, if the query targets the payroll data on a first host machine, the DBMS 110 and/or the security component 111 may perform an OR operation on the bitmaps corresponding to the payroll table on each host machine in the distributed environment. If the result of the OR operation indicates a count of payroll records that have been accessed exceeds a threshold amount (e.g., 50% of the bits), the DBMS 110 and/or the security component 111 may determine that the data is being improperly accessed. In another embodiment, the DBMS 110 and/or the security component 111 may determine that the distributed data is being improperly accessed by determining whether a threshold amount of data in database table is accessed across all distributed copies. For example, if a table includes 100,000 rows of data, and the threshold amount is 33%, the DBMS 110 and/or the security component 111 may determine whether more than 333,333 rows of data in the table have been accessed from all copies of the table in the distributed environment. If the threshold is exceeded. At block 460, the DBMS 110 and/or the security component 111 may generate a trigger to perform a predefined operation upon determining that the distributed database data is being improperly accessed. The trigger may cause a system component to secure the data in the distributed environment, by, for example, taking the database offline, disabling user accounts, disabling access by applications, and the like.

Figure 5:
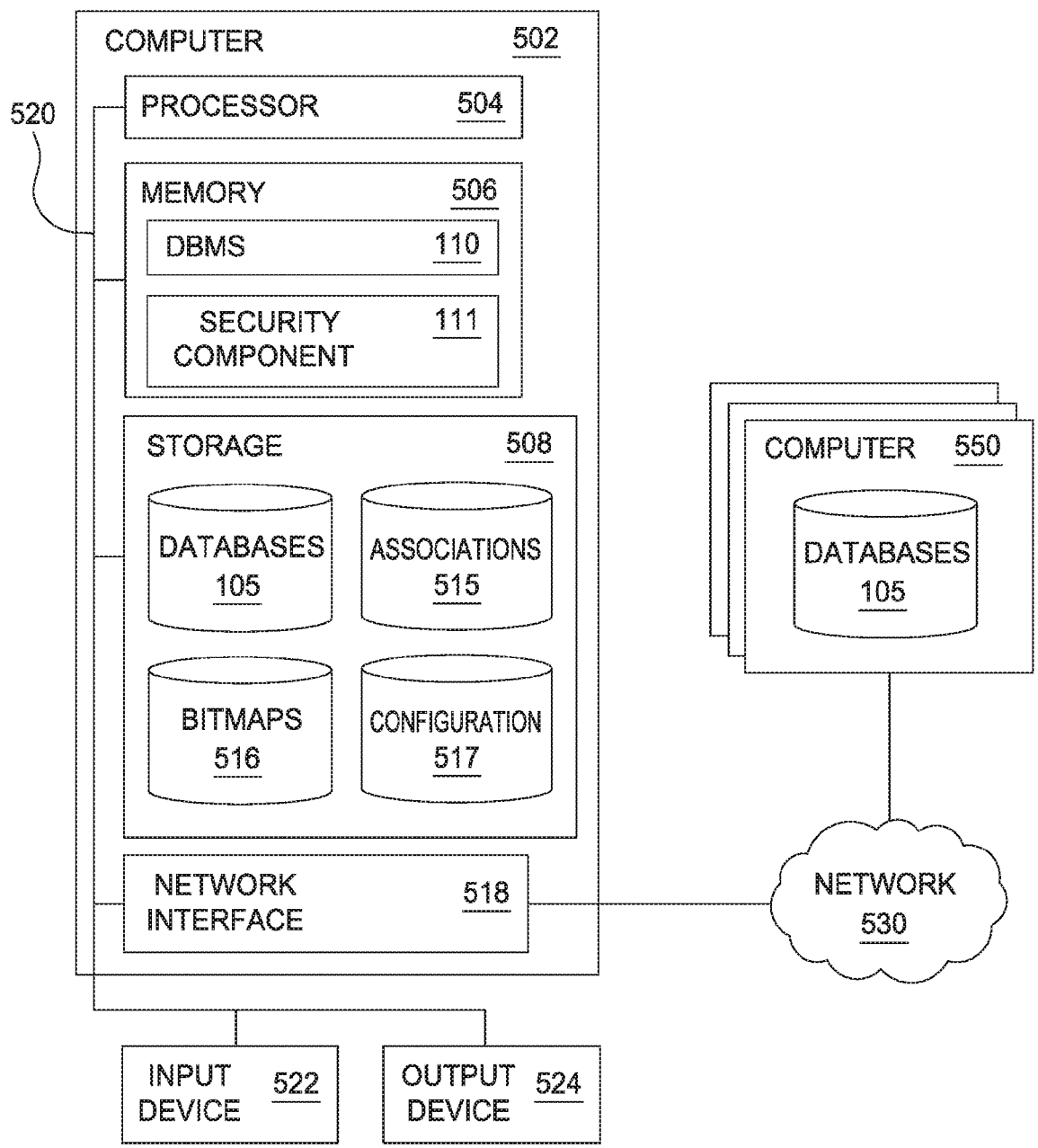
FIG. 5 is a block diagram illustrating a system which detects malicious data access in a distributed environment, according to one embodiment.

FIG. 5 is a block diagram illustrating a system 500 which detects malicious data access in a distributed environment, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the DBMS 110 and the security component 111. As shown, the storage 508 contains the databases 105, associations 515, bitmaps 516, and configuration 517. The databases 105 are representative of any type of database that is stored across multiple systems (physical and/or virtualized). The associations 515 include user-defined and dynamically generated associations between instances of databases in the distributed computing environment, e.g., the databases 105 on the computers 550. The computers 550 may be physical or virtualized systems that store distributed database data (e.g., for redundancy, disaster recovery, load balancing, and the like). The bitmaps 516 include the bitmaps used to maintain and monitor accesses to each database 105. The configuration 517 includes settings and rules used to determine whether distributed database data is being extracted in a piecewise fashion across multiple instances of the database. For example, the configuration 517 may include rules identifying when trusted applications execute, what type of data these trusted applications access (and how much of the data is accessed), thresholds for determining whether the distributed data is being accessed (e.g., 40% of the rows, 30% for a sensitive column, and the like).

FIG. 6 illustrates example bitmaps used to detect malicious data access, according to one embodiment. As shown, FIG. 6 depicts bitmaps 140-142 of FIG. 1 in greater detail. The bitmaps 140-142 each include a plurality of entries, where each entry corresponds to some unit of data in the corresponding database $105_{1-3}$. For example, an entry in the bitmaps 140-142 may correspond to one or more rows of data in the databases $105_{1-3}$. If the entry in the bitmaps 140-142 is set to zero, the corresponding data has not been targeted (or read) by a query. However, if the entry in the bitmaps 140-142 is set to one, the data has been read by a query. Initially, the entries of each bitmap 140-142 may be set to zero. As data is accessed, the DBMS 110 and/or the security component 111 may modify the corresponding entry in the bitmaps 140-142, e.g., set the value to the entry to one.

As shown, the third and fourth rows of bitmap 140 are set to one, indicating the corresponding data in database $105_1$ has been accessed by a query. Similarly, the first and second rows of bitmap 141 are set to one, indicating the corresponding data in database $105_2$ has been accessed by a query. Further still, the seventh and eighth rows of data in the bitmap 142 are set to one, indicating the corresponding data in database $105_3$ has been accessed by a query.

As shown, FIG. 6 also includes a comparison result bitmap 601. The bitmap 601 reflects the result of an example operation performed on bitmaps 140-142. In the embodiment depicted in FIG. 6, the operation is an "OR" operation that is performed on bitmaps 140-142. Therefore, as shown, the first, second, third, fourth, seventh, and eighth rows of bitmap 601 are set to one. After performing the OR operation on the bitmaps 140-142, the security component 111 and/or the DBMS 110 may determine whether the result stored in bitmap 601 indicates that the data in the databases $105_{1-3}$ is subject to an improper, malicious attack. For example, the security component 111 and/or the DBMS 110 may determine whether a count of bits set to one in the bitmap 601 exceed a threshold number of bits. If, for example, the threshold is half of the bits in the bitmap 601, the security component 111 and/or the DBMS 110 may determine that the data in the databases $105_{1-3}$ are being subject to a malicious attack, as more than half of the bits in the bitmap 601 are set to one. As previously indicated, however, the security component 111 and/or the DBMS 110 may apply any comparison operation and/or threshold in determining whether the bitmaps reflect that the data in the databases $105_{1-3}$ are subject to a malicious attack.

Advantageously, embodiments disclosed herein detect when users are maliciously extracting data from distributed databases in an incremental, piecewise fashion to avoid detection. By maintaining records of what data is accessed across all instances of the distributed databases, embodiments disclosed herein may identify when the collective data pull is indicative of inappropriate behavior.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the security component 111 could execute on a computing system in the cloud to detect inappropriate data access to distributed databases. In such a case, the security component 111 could receive query metadata and store indications of data accesses in bitmaps stored in a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   identifying a first access to a first subset of a first database table on a first storage node, of a plurality of storage nodes;
   identifying a second access to a second subset of the first database table on a second storage node, of the plurality of storage nodes; and
   performing a predefined operation to restrict access to the first database table on the plurality of storage nodes based on the first and second accesses, and further based on determining that the first database table is being improperly accessed, wherein determining that the first database table is being improperly accessed comprises:
      comparing a first bitmap associated with the first database table on the first storage node to a second bitmap associated with the first database table on the second storage node, wherein comparing the first and second bitmaps comprises performing at least one of: (i) an AND operation, and (ii) an OR operation on the first and second bitmaps; and
      determining that a result of the comparison of the bitmaps exceeds a predefined threshold.

2. The method of claim 1, wherein the second subset of the first database table is a copy of the first subset of the first database table, wherein the first and second storage nodes are different storage nodes located on different systems, wherein an indication of the first access is stored in the first bitmap subsequent to the first access, wherein an indication of the second access is stored in the second bitmap subsequent to the second access.

3. The method of claim 1, wherein determining the first database table is being improperly accessed further comprises:
   comparing the result of the first and second bitmaps to a third bitmap, wherein the third bitmap reflects accesses to the first database table on the plurality of storage nodes by trusted applications; and
   determining that the comparison of the result of the comparison of the first and second bitmaps to the third bitmap exceeds a predefined threshold.

4. The method of claim 1, wherein the first and second bitmaps comprise three-dimensional bitmaps, wherein a first dimension of the first and second bitmaps is configured to store an indication of an access to each of a plurality of rows of the first database table, wherein a second dimension of the first and second bitmaps is configured to store an indication of an access to each of a plurality of columns of the first database table, and wherein a third dimension of the first and second bitmaps is configured to store an indication of a user accessing the first database table.

5. The method of claim 1, wherein the first database table on the first storage node is a modified version of the first database table on the second storage node, wherein the method further comprises:
   defining an association between the first database table on the first storage node and the first database table on the second storage node; and
   subsequent to identifying the first and second accesses and prior to performing the predefined operation, determining that the association between the first database table on the first storage node and the first database table on the second storage node exists.

6. The method of claim 1, wherein the predefined operation is performed upon further determining:
   that the first and second accesses were made by at least one of: (i) a first user, and (ii) a first computer; and
   that the first and second accesses were not made by a trusted application.

7. A system, comprising:
   a processor; and
   a memory containing a program which when executed by the processor performs an operation comprising:
      identifying a first access to a first subset of a first database table on a first storage node, of a plurality of storage nodes;

identifying a second access to a second subset of the first database table on a second storage node, of the plurality of storage nodes; and performing a predefined operation to restrict access to the first database table on the plurality of storage nodes based on the first and second accesses, and further based on determining that the first database table is being improperly accessed, wherein determining that the first database table is being improperly accessed comprises:

comparing a first bitmap associated with the first database table on the first storage node to a second bitmap associated with the first database table on the second storage node, wherein comparing the first and second bitmaps comprises performing at least one of: (i) an AND operation, and (ii) an OR operation on the first and second bitmaps; and determining that a result of the comparison of the bitmaps exceeds a predefined threshold.

8. The system of claim 7, wherein the second subset of the first database table is a copy of the first subset of the first database table, wherein the first and second storage nodes are different storage nodes located on different systems, wherein an indication of the first access is stored in the first bitmap subsequent to the first access, wherein an indication of the second access is stored in the second bitmap subsequent to the second access.

9. The system of claim 7, wherein determining the first database table is being improperly accessed further comprises:

comparing the result of the first and second bitmaps to a third bitmap, wherein the third bitmap reflects accesses to the first database table on the plurality of storage nodes by trusted applications; and determining that the comparison of the result of the comparison of the first and second bitmaps to the third bitmap exceeds a predefined threshold.

10. The system of claim 7, wherein the first and second bitmaps comprise three-dimensional bitmaps, wherein a first dimension of the first and second bitmaps is configured to store an indication of an access to each of a plurality of rows of the first database table, wherein a second dimension of the first and second bitmaps is configured to store an indication of an access to each of a plurality of columns of the first database table, and wherein a third dimension of the first and second bitmaps is configured to store an indication of a user accessing the first database table.

11. The system of claim 7, wherein the first database table on the first storage node is a modified version of the first database table on the second storage node, wherein the operation further comprises:

defining an association between the first database table on the first storage node and the first database table on the second storage node; and subsequent to identifying the first and second accesses and prior to performing the predefined operation, determining that the association between the first database table on the first storage node and the first database table on the second storage node exists.

12. The system of claim 7, wherein the predefined operation is performed upon further determining:

that the first and second accesses were made by at least one of: (i) a first user, and (ii) a first computer; and that the first and second accesses were not made by a trusted application.

13. A computer program product, comprising:

a non-transitory computer-readable storage medium having computer-readable program code embodied therewith, the computer-readable program code executable by one or more computer processors to perform an operation comprising:

identifying a first access to a first subset of a first database table on a first storage node, of a plurality of storage nodes;

identifying a second access to a second subset of the first database table on a second storage node, of the plurality of storage nodes; and performing a predefined operation to restrict access to the first database table on the plurality of storage nodes based on the first and second accesses, and further based on determining that the first database table is being improperly accessed, wherein determining that the first database table is being improperly accessed comprises:

comparing a first bitmap associated with the first database table on the first storage node to a second bitmap associated with the first database table on the second storage node, wherein comparing the first and second bitmaps comprises performing at least one of: (i) an AND operation, and (ii) an OR operation on the first and second bitmaps; and determining that a result of the comparison of the bitmaps exceeds a predefined threshold.

14. The computer program product of claim 13, wherein the second subset of the first database table is a copy of the first subset of the first database table, wherein the first and second storage nodes are different storage nodes located on different systems, wherein an indication of the first access is stored in the first bitmap subsequent to the first access, wherein an indication of the second access is stored in the second bitmap subsequent to the second access.

15. The computer program product of claim 13, wherein determining the first database table is being improperly accessed further comprises:

comparing the result of the first and second bitmaps to a third bitmap, wherein the third bitmap comprises reflects accesses to the first database table on the plurality of storage nodes by trusted applications; and determining that the comparison of the result of the comparison of the first and second bitmaps to the third bitmap exceeds a predefined threshold.

16. The computer program product of claim 13, wherein the first and second bitmaps comprise three-dimensional bitmaps, wherein a first dimension of the first and second bitmaps is configured to store an indication of an access to each of a plurality of rows of the first database table, wherein a second dimension of the first and second bitmaps is configured to store an indication of an access to each of a plurality of columns of the first database table, and wherein a third dimension of the first and second bitmaps is configured to store an indication of a user accessing the first database table.

17. The computer program product of claim 13, wherein the first database table on the first storage node is a modified version of the first database table on the second storage node, wherein the operation further comprises:

defining an association between the first database table on the first storage node and the first database table on the second storage node; and subsequent to identifying the first and second accesses and prior to performing the predefined operation, determining that the association between the first database table on the first storage node and the first database table on the second storage node exists.

\* \* \* \* \*